Jan. 26, 1954

M. M. PALUCH ET AL 2,667,155

AUTOMATIC GAS INLET VALVE

Filed Dec. 31, 1952

Inventors
Milton M. Paluch, &
Conrad A. Teichert
By Willits, Helwig & Baillio
Attorneys Patented Jan. 26, 1954

2,667,155

UNITED STATES PATENT OFFICE 2,667,155

AUTOMATIC GAS INLET VALVE

Milton M. Paluch and Conrad A. Teichert, Grand Rapids, Mich., assignors to General Motors Corporation, Detroit, Mich., a corporation of Delaware Application December 31, 1952, Serial No. 328,912

9 Claims. (Cl. 123—189)

This invention relates to internal combustion engines and particularly to improved means for controlling the admission of gas fuel thereto.

The principal object of the invention is to provide means for utilizing the engine combustion chamber pressure and the pressure of the gas fuel to control the opening and closing of a gas fuel inlet valve in timed relation with the engine operating cycle.

More specifically, it is an object of the invention to provide an internal combustion engine gas fuel inlet valve which is movable in the opening and closing directions by the gas fuel supply and engine combustion chamber pressures, respectively, is moved to its open position against the combustion chamber pressure by the gas fuel supply pressure during each period between successive engine firings, and includes means automatically operative during successive predetermined portions of each such period to initially delay and then release full application of the gas fuel supply pressure to the valve.

These and other objects will be more readily appreciated from the following description of a preferred embodiment of the invention, having reference to the drawing wherein.

Figure 1:
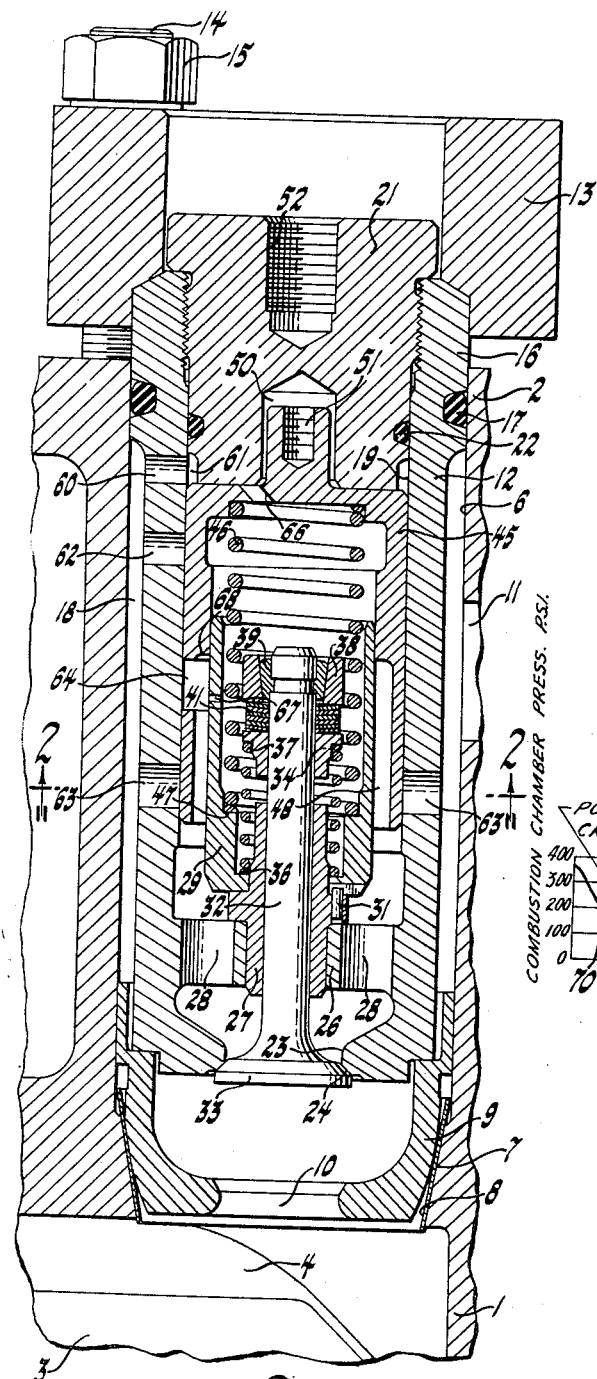
Figure 1 is a fragmentary sectional view of an internal combustion engine incorporating the novel gas fuel inlet valve.

In Figure 1 the engine is shown as including an integral cylinder 1 and cylinder head 2 which together with a piston 3 form a combustion chamber 4. The cylinder head has a bore 6 provided therein and terminating at one end in a tapered inlet 7 to the combustion chamber 4. Lining this tapered inlet 7 is a gasket ring 8 of ductile metal and seating in this ring is a cup 9 having its upper end open and fitting the bore 6. The bottom or end wall of the cup has an aperture 10 through which the gas fuel enters the combustion chamber 4. At 11 is a duct formed in the cylinder head and connecting the bore 6 with a suitable source (not shown) of gas fuel under pressure. The pressure at which this gas fuel is introduced to the engine is not critical, provided it is maintained substantially constant and at a value in excess of that existing in the combustion chamber during the period between engine firings when the exhaust and air inlet valves or ports (not shown) are open.

The bore 6 as shown extends through the top of the cylinder head 2, and inserted into this bore is a housing 12 whose lower end rests on the cup 9 and is held there-against by a clamping ring 13 suitably secured to the top of the cylinder head as by one or more studs 14 and nuts 15. The upper end 16 of housing 12 is of increased thickness to fit closely in the upper end of the bore 6 and is sealed thereto against leakage of gas pressure as by a rubber O-ring 17 compressed in an annular groove formed in the external periphery of the housing. The external periphery of the housing below the O-ring 17 is relieved to cooperate with the bore 6 in providing an annular gas receiving chamber 18 communicating with the duct 11. The housing 16 is generally cylindrical in shape with side walls forming a bore 19 closed at its upper end by a threaded plug 21 which is sealed to the bore 19 against the escape of gas pressure by a rubber O-ring 22. At the lower end of the housing is a gas discharge opening 23 communicating with the housing bore 19 and terminating at its end nearest the combustion chamber with a valve seating surface 24. Between the discharge opening 23 and the open end of the housing bore 19 the side walls of the housing are provided with a shoulder 26 having a central aperture receiving a valve guide 27 and a ring of circumferentially spaced apertures 28 which provide for flow of the gas fuel to the opening 23 from the housing bore 19. Intermediate its ends, the guide 27 is provided with an external flange which rests on the shoulder 26 and, in turn, forms an abutment for the lower end of a sleeve 29 extending centrally into the housing bore and spaced radially therefrom. Anchoring the sleeve against rotation about the guide is a dowel 31 which is press-fitted into a hole in the guide flange and has its upper end engaging a slot in the lower end of the sleeve.

Slidably fitting the guide 27 is the stem 32 of a poppet valve having a head 33 which is slightly larger than the aperture 10 whereby the cup 9 will prevent the poppet valve head from dropping into the combustion chamber in the event its stem should break during engine operation. Slidably fitting the poppet valve stem is a retainer washer 34, and between this washer and a shoulder 36 on the sleeve 29 is compressed a helical valve return spring 37. Adjacent its upper end the poppet valve stem is provided with a fixed abutment in the form of a ring 38 having a tapered inner periphery receiving correspondingly tapered locks 39 having a tongue and groove inter-engagement with the periphery of the stem. Cushioning spring washers 41 are arranged on the stem between the ring 38 and the retainer washer 34 to reduce transmission of impact shocks to the stem resulting from the retainer washer striking the upper end of the valve guide in limiting opening movements of the poppet valve.

Slidably fitting the bore 19 of the housing and the external periphery of the sleeve 29 is the skirt 45 of an inverted cup shaped piston valve whose closed or head end is normally retained in abutment with the plug 21 by a second helical compression spring 46 concentric with the spring 37 and resting on a shoulder 47 of the sleeve. The interior of the piston valve skirt has a counterbore 48 terminating below the upper end of the sleeve. The head end of the piston valve is shown provided with an upwardly extending projection which recesses into a cavity 50 formed in the lower end of the plug 21, and this projection is provided with a threaded blind hole 51 adapted to threadedly engage a suitable extracting tool (not shown) for facilitating withdrawal of the piston from the housing 16. Similarly, the upper end of the plug 21 is provided with a threaded blind hole 52 for engagement with an extracting tool (not shown) for facilitating withdrawal of the housing from the cylinder head.

Figure 2:
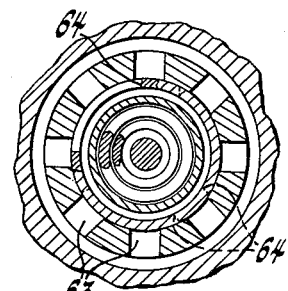
Figure 2 is a sectional view taken substantially on line 2—2 of Figure 1.

Adjacent the lower end of the plug 21 the housing bore 19 is connected to the gas receiving chamber 18 by a gas inlet passage 60, and the lower end of the external periphery of the plug 21 is relieved to provide an annular passage 61 communicating with this passage 60. Spaced below the passage 60 is a gas inlet port 62 extending through the housing wall from the gas receiving chamber 18 to the housing bore 19. A plurality of additional gas inlet ports 63 in circumferentially spaced relation extend through the housing wall from the chamber 18 to the bore 19 at a distance below the port 62. Adapted to register with these ports 63 are a ring of circumferentially spaced and elongated ports 64 which connect the upper end of the counterbore 48 to the outer periphery of the piston valve skirt. As will be seen from Figure 2, the number and circumferential spacing of the ports 63 and 64 insures their having ample overlap in any relative angular position of the piston valve in the housing. The ports 62 and 63 are closed off by the external periphery of the piston valve skirt when the piston valve is in abutment with the plug 21, and the relative spacing of these ports from the plug 21 serves in part to control the gas fuel pressure acting against the valve head 33 during engine operation.

The sleeve 29 has a substantially pressure tight fit at its lower end with the valve guide, and by reason of the sliding fit of the sleeve on the internal periphery of the piston valve skirt, a dash-pot is formed between the piston valve and the sleeve. A gas inlet orifice 66 of restricted flow capacity is provided in the end wall of the piston valve, through which gas is permitted to flow into this dash-pot from the plug end of the bore 19, and a gas outlet orifice 67 of further restricted flow capacity is provided in the wall of the sleeve 29. The latter orifice 67 permits gas pressure to bleed out of the dash-pot into the counterbore 48 until the outer end of this orifice is closed by the control edge 68 formed by the upper end of the counterbore 48. Thus, the counterbore 48 serves as a gas transfer passage connecting the housing ports 63 and the interior of the housing below the piston valve when the piston valve is at the lower end of its stroke, and connecting the outlet orifice 67 to the interior of the housing below the piston valve prior to registry of the ports 63 with the ports 64.

During engine operation, gas fuel under pressure from the chamber 18 is applied against the poppet valve head 33, either via the gas inlet passage 60, orifices 66, 67 and counterbore 48; or via the gas inlet ports 63, 64 and counterbore 48.

During approximately the last half of each engine compression stroke and approximately the first half of the succeeding power stroke the pressure in the combustion chamber 4 is sufficiently high to maintain the poppet valve in its seated position shown, against the gas pressure tending to open the same, and by reason of the gas pressure acting with equal force in opposite directions against the piston valve the latter is held by its spring 46 in its normal position shown in abutment with the plug 21. Then, as the engine piston approaches its mid-stroke position, resulting in a sufficient decrease in engine combustion chamber pressure, the gas pressure below the piston valve overcomes the force of the poppet valve return spring 37 to cause the poppet valve to move a slight distance off its seat 24. As a result, the gas pressure below the piston valve drops to a value somewhat below the gas fuel supply pressure existing in the chamber 18 and the dash-pot, whereby the gas begins flowing through the orifice 67 from the dash-pot and permits the piston valve to move downwardly against its spring 46 in response to the gas pressure acting against the upper end of the piston valve. The rate at which the piston valve travels in this downward direction is dependent on a number of factors, including the relative flow capacities of the orifices 66 and 67, the loads imposed on the poppet valve and piston valve by the springs 37 and 46, and the difference in effective pressure areas subjected to the gas fuel pressure above and below the piston valve. As the piston valve continues its downward movement the upper end thereof uncovers the gas inlet port 62, whereupon the additional inflow of gas fuel from the chamber 18 into the housing bore operates to compensate for the increasing load of the spring 46 opposing the advancement of the piston valve. With further downward movement of the piston valve the ports 63 and 64 come into registry and gas fuel under pressure in the chamber 18 is then supplied in sufficient volume via the counterbore 48 to the interior of the housing below the piston valve to raise the pressure acting downwardly on the poppet valve head that this pressure (coupled with the gas pressure in the dash-pot) is sufficient to force the poppet valve to its fully open position. The poppet valve thereupon remains open until the combustion chamber pressure increases sufficiently during the succeeding compression stroke to overcome the opposing gas pressure and force the poppet valve to again return to its seat. After the poppet valve is thus closed, the gas pressure then acts with equal force in opposite directions against the piston valve and the spring 46 serves to return the piston valve to its initial position in abutment with the plug 21.

Figure 3:
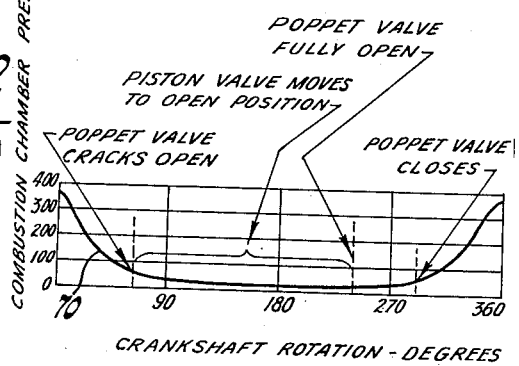
Figure 3 is an engine timing diagram showing the sequence of events in the operating cycle of the valve of Figure 1.

In Figure 3 the curve 70 represents the fluctuations in combustion chamber pressure during one operating cycle of a conventional two-stroke cycle engine. As indicated therein, the poppet valve controlling the gas fuel admission cracks open at approximately 70° after "top dead center," and during the succeeding period of approximately 150° of crankshaft rotation the piston valve moves from its initial position in abutment with the plug 21 to its position permitting registry of the gas inlet ports 63 and 64. Thereupon a quick opening of the poppet valve is effected by the gas fuel pressure, and it then remains open for approximately 65° of crankshaft rotation until the combustion chamber pressure again rises to a value sufficient to again close the poppet valve.

While it is believed the above described means for controlling the gas fuel inlet valve has advantages peculiar to the operation of a two-cycle engine, certain features of the invention as disclosed are considered applicable to the control of gas operated valves generally. Also, while only a single preferred embodiment of the invention has been disclosed, it is appreciated that numerous minor changes in the construction and arrangement of the parts may be made without departing from the spirit and scope of the invention as defined in the following claims.

We claim:

1. In combination, a poppet valve, a cylinder having a bore embracing the valve, one end of said cylinder being closed and its other end having an opening terminating outwardly thereof in a seat for the valve, a hollow piston having a head disposed between the valve and the closed end of the cylinder and a skirt slidably fitting the cylinder bore, structure within the cylinder and rigidly associated therewith having an internal surface slidably guiding the valve and an external surface slidably fitting the internal periphery of the piston skirt, said cylinder having a passage connecting the cylinder exterior with the closed end of said bore, said cylinder also having a port connecting the cylinder exterior with said bore intermediate its ends, said piston skirt normally closing said port and having a transfer passage communicating with said opening, said piston skirt also having a port normally closed by the cylinder and connecting said transfer passage to the external periphery of the piston skirt, said ports being registerable with each other upon a predetermined displacement of the piston from a normal position adjacent said cylinder closed end, said piston head having an orifice extending therethrough of predetermined restricted fluid flow capacity relative to the flow capacities of said ports, said structure having an orifice providing communication between said transfer passage and said first named orifice while said ports are out of registry, said last named orifice being of a size having a predetermined restricted flow capacity relative to said first named orifice and being closed by the piston skirt when said ports are in registry, and springs reacting against said structure and respectively urging the piston head to a position adjacent said cylinder closed end and urging the valve against said seat.

2. In combination with an internal combustion engine having a duct for conducting gas fuel under pressure to a working cylinder of the engine and a poppet valve for controlling the admission of the gas fuel to said engine cylinder, a housing rigid with the engine cylinder defining an elongated closed chamber embracing the valve, said chamber having a gas discharge opening at one end communicating with the engine cylinder and a gas inlet passage at its other end communicating with said duct, a seat for the valve defining the cylinder end of said discharge opening, said chamber having a gas inlet port intermediate its ends communicating with said duct, a piston within the chamber between its said other end and the valve, said piston having an orifice providing communication between said other end of the chamber and the space within the chamber between the piston and valve, said piston also having a gas transfer passage normally closed by the housing but adapted to provide communication between said port and said opening upon a predetermined displacement of the piston from said other end of the chamber, a first spring resiliently opposing said piston displacement, a second spring normally holding the valve on its seat, and structure within the chamber providing an abutment for said springs and a guide for the valve, said structure having an orifice closed by the piston when said transfer passage is in communication with said port but providing communication between said chamber space and said opening when said transfer passage is out of communication with said port.

3. In an internal combustion engine, a cylinder head defining one wall of a combustion chamber and having a bore extending into said wall, a duct connected to said bore for the delivery thereto of gas fuel under pressure, a poppet valve reciprocably mounted in said bore for controlling the admission of the gas fuel to the combustion chamber, said valve being openable in the direction toward the combustion chamber, supporting means for the valve within said bore including a cylinder member closed at one end and having a gas discharge opening at its other end forming a seat for the valve, a generally cup-shaped piston having its skirt portion extending toward said valve seat and slidably fitting the internal periphery of the cylinder member, a sleeve secured to said supporting means and slidably fitting the internal periphery of the piston skirt portion, said sleeve and skirt portion having surfaces cooperatively defining a gas transfer passage open at one end to said discharge opening, and spring members thrustably interposed between said supporting means and said valve and piston tending to retain the valve on its seat and urging the piston toward the closed end of the cylinder member, said cylinder member and cylinder head bore having surfaces cooperatively defining a receiving chamber for gas fuel delivered by said duct, said cylinder member having a gas inlet passage connecting said chamber to the interior of the cylinder member between the piston and said closed end, said piston having an orifice connecting the interior of the piston with the interior of the cylinder member between the piston and said closed end, said piston skirt portion having a port connecting said transfer passage to the external periphery of the piston skirt portion, said cylinder member having a port connecting said chamber with the internal periphery of the cylinder member, said ports being normally out of registry but registerable with each other upon a predetermined movement of the piston away from said closed end, said sleeve having an orifice connecting said transfer passage with the interior of the piston when said ports are out of registry, said last named orifice being closed by the piston when said ports are in registry.

4. In combination with a two-cycle engine having a combustion chamber, a source of gas fuel under pressure and a poppet valve openable against the engine combustion chamber pressure and controlling the delivery of gas fuel from said source to the combustion chamber, a spring connected to the valve and acting to assist the combustion chamber pressure in resiliently opposing opening movements of the valve, a housing having an opening defining a seat for the valve, said housing having a bore closed at one end and connected at its other end with said opening, a sleeve extending longitudinally of and spaced inwardly of said bore, one end of said sleeve being closed and its other end being open to the closed end of said bore, a generally cup-shaped piston having a head interposed between the sleeve and the closed end of the bore and having a skirt slidably interfitted between the sleeve and said bore, and a spring tending to urge the piston toward said closed end of the bore, said housing having a passage connecting the closed end of the bore to said gas pressure source and a piston controlled port intermediate the ends of the bore connected to said gas pressure source, said piston having a port communicating with said opening and registerable with said last named port only after a predetermined displacement of the piston from said closed end, said piston head having an orifice of restricted flow capacity extending therethrough, said sleeve having an orifice of restricted flow capacity extending therethrough providing communication between said piston head orifice and said opening when said ports are out of registry.

5. In a gas fueled internal combustion engine having a combustion chamber and an inlet thereto for the gas, a valve movable to close said inlet in response to increasing combustion chamber pressure during the compression stroke and movable to open said inlet in response to gas pressure during the power stroke, means for conducting gas to said valve at a pressure exceeding the combustion chamber pressure during a portion of the period between successive firings of the combustion chamber, said means including a housing having a bore closed at one end and open at its other end to said combustion chamber inlet, said housing having a gas inlet passage communicating with the closed end of the bore and a gas inlet port communicating with the bore intermediate the ends of the bore, a spring within the bore and supported by the housing, a piston normally closing said port but advanceable in opposition to said spring by gas pressure in the closed end of said bore, said piston having a port communicating with said combustion chamber inlet and registerable with said gas inlet port when the piston has advanced a predetermined distance from the closed end of the bore, and a member cooperating with the piston to form a dash-pot for delaying the advancement of the piston, said dash-pot having a gas inlet orifice communicating with and of less flow capacity than said gas inlet passage and having a gas outlet orifice of less flow capacity than said gas inlet orifice and communicating with said combustion chamber inlet.

6. In an automatic gas fuel admission device for an internal combustion engine, a poppet valve having a valve head having one side exposed to engine combustion chamber pressure, a stem extending from the opposite side of said valve head, a housing enclosing said stem and having a bore closed at one end, said housing having an opening communicating with said bore and defining a seat engageable by said opposite side of the valve head, a shoulder in said housing with apertures for passage of the valve stem and flow of gas to said opening from said bore, a valve stem guide radially supported by the shoulder and having an external flange intermediate its ends resting on the shoulder, a sleeve in spaced coaxial relation with said bore having one end resting on said flange and radially supported by the guide, shoulders on the inner periphery of said sleeve, concentric helical springs resting on said last named shoulders, a fixed abutment on the valve stem, a retainer washer slidably fitting the valve stem and resting on the inner of said springs, a stack of spring washers slidably fitting the valve stem between said abutment and retainer washer, and an inverted cup-shaped member normally abutting said closed end of the bore and having its end wall resting on the outer of said springs and its side walls slidably interfitted between the sleeve and said bore, said side walls having a counterbore and a plurality of circumferentially spaced ports connecting the end of said counterbore with the external periphery of said member, said end wall having an orifice, said sleeve extending above said counterbore and having an orifice located to connect with said counterbore until said member is displaced a predetermined distance from said closed end of the bore, said housing member having an annular external groove, a gas inlet passage connecting said groove to the closed end of said bore, a plurality of circumferentially spaced ports connecting said groove to the bore for registry with said counterbore connected ports upon displacement of the member said predetermined distance, and a port located to connect said groove with the closed end of the bore after said member has been displaced a distance less than said predetermined distance.

7. In a fluid pressure responsive valve device for controlling the admission of fluid under pressure to a chamber subjected to varying pressures, a poppet valve having a head and a stem, a cylinder member surrounding the valve stem having an outlet opening closable by the valve head, a fluid inlet passage spaced from said opening and a fluid inlet port intermediate said opening and passage, a hollow piston slidably reciprocable in said member and controlling said port, biasing means acting on said valve stem to normally maintain said opening closed by the valve head and acting on said piston to normally maintain said port closed by the piston, and structure fixed to the cylinder member and extending into the piston to form a dashpot, said piston having an orifice providing for the flow of fluid into said dashpot at a predetermined restricted rate from the interior of the cylinder member above the piston, said structure having an orifice providing for the flow of fluid from said dashpot at a predetermined restricted rate into the interior of the cylinder member below the piston.

8. In combination with an internal combustion engine having a duct for conducting gas fuel under pressure to a working cylinder of the engine and a poppet valve for controlling the admission of the gas fuel to said engine cylinder, a housing rigid with the engine cylinder defining an elongated closed chamber embracing the valve, said chamber having a gas discharge opening at one end communicating with the engine cylinder and a gas inlet passage at its other end communicating with said duct, a seat for the valve defining the cylinder end of said discharge opening, said chamber having a gas inlet port intermediate its ends communicating with said duct, a piston within the chamber between its said other end and the valve, said piston having an orifice providing communication between said other end of the chamber and the space within the chamber between the piston and valve, said piston also having a gas transfer passage normally closed by the housing but adapted to provide communication between said port and said opening upon a predetermined displacement of the piston from said other end of the chamber, a first spring resiliently opposing said piston displacement, a second spring normally holding the valve on its seat, and structure within the chamber having an orifice closed by the piston when said transfer passage is in communication with said port but providing communication between said chamber space and said opening when said transfer passage is out of communication with said port.

9. In a fluid pressure responsive valve device for controlling the admission of fluid under pressure to a chamber subjected to varying pressures, a poppet valve having a head and a stem, a cylinder member into which the valve stem extends having an outlet opening closable by the valve head, a fluid inlet passage spaced from said opening and a fluid inlet port intermediate said opening and passage, a piston slidably reciprocable in said member and controlling said port, biasing means acting on said valve stem to normally maintain said opening closed by the valve head and acting on said piston to normally maintain said port closed by the piston, and structure fixed to the cylinder member and cooperating with said piston to form a dashpot, said piston having an orifice providing for the flow of fluid into said dashpot at a predetermined restricted rate from the interior of the cylinder member above the piston, said structure having an orifice providing for the flow of fluid from said dashpot at a predetermined restricted rate into the interior of the cylinder member below the piston.

MILTON M. PALUCH.
CONRAD A. TEICHERT.

References Cited in the file of this patent

UNITED STATES PATENTS

| Number | Name | Date |
|---|---|---|
| 2,361,502 | Sandhofer | Oct. 31, 1944 |
| 2,552,960 | Grieshaber et al. | May 15, 1951 |